United States Patent [19]

Meade et al.

[11] Patent Number: 5,320,488

[45] Date of Patent: Jun. 14, 1994

[54] TURBINE DISK INTERSTAGE SEAL ANTI-ROTATION SYSTEM

[75] Inventors: Robert J. Meade, West Chester; Richard W. Albrecht, Fairfield, both of Ohio; Norbert E. Meyer, Edgewood, Ky.

[73] Assignee: General Electric Company, Cincinnati, Ohio

[21] Appl. No.: 6,895

[22] Filed: Jan. 21, 1993

[51] Int. Cl.$^5$ .............................................. F01D 11/02
[52] U.S. Cl. .............................. 415/173.7; 415/174.5; 415/199.5
[58] Field of Search ............... 415/173.7, 173.5, 174.5, 415/199.5; 416/198 A, 201 R, 220 R

[56] References Cited

U.S. PATENT DOCUMENTS

| | | | |
|---|---|---|---|
| 1,792,288 | 2/1931 | Dempster | 415/199.5 |
| 3,094,309 | 6/1963 | Hull, Jr. et al. | 415/173.7 |
| 3,941,500 | 3/1976 | Glenn | |
| 4,239,451 | 12/1980 | Bouru | |
| 4,432,697 | 2/1984 | Miura et al. | 415/199.5 |
| 4,669,959 | 6/1987 | Kalogeros | |
| 4,750,746 | 6/1988 | Boudot et al. | |
| 4,846,628 | 7/1989 | Antonellis | |
| 5,173,024 | 12/1992 | Mouchel et al. | 416/95 |
| 5,236,302 | 8/1993 | Weisgerber et al. | 415/173.7 |

FOREIGN PATENT DOCUMENTS 1194781 6/1970 United Kingdom ............. 415/199.5

Primary Examiner—Edward K. Look
Assistant Examiner—James A. Larson
Attorney, Agent, or Firm—Jerome C. Squillaro; Nathan D. Herkamp

[57] ABSTRACT

An anti-rotation system for an interstage seal located in a gas turbine engine of a type having a turbine section including a first stage disk having a rearwardly extending aft shaft and a second stage disk. The interstage seal includes a rearwardly projecting conical arm mounted on the first stage disk. The interstage seal anti-rotation system includes a key inserted within an opening formed between the aft shaft and the conical arm for preventing circumferential movement between the aft shaft and the conical arm by providing a double shear plane between the aft shaft and the conical arm. A circumferential wire is inserted within a slot formed in the conical arm and a groove on the key for preventing axial movement of the key.

7 Claims, 4 Drawing Sheets

TURBINE DISK INTERSTAGE SEAL ANTI-ROTATION SYSTEM

BACKGROUND OF THE INVENTION

The present invention relates to gas turbine engines and, more particularly, to aircraft-type high bypass ratio turbine engines having multi-stage compressor and turbine sections.

A typical modern gas turbine aircraft engine, particularly of the high bypass ratio type, includes multi-stage high pressure compressor and turbine sections interconnected by a central compression shaft or, in some models, a forward shaft. In the latter instance, the forward shaft extends between the webs of the last stage high pressure compressor disk and the first stage high pressure turbine disk webs. The high pressure turbine section typically includes first and second stage disks in which the second stage disk is attached to the first stage disk by a bolted connection. The interstage volume between the first and second stage disks is enclosed by a shield extending between the outer peripheries of the turbine disks. The shield is generally cylindrical in shape and its wall is outwardly convex in shape.

The first and second stage disks are isolated by a forward face plate, attached to the forward face of the first stage disk, and an aft seal attached to the rearward face of the second stage disk web. Typically, cooling air ducted externally from the compressor section is circulated within the volumes defined by the face plate and aft seal, as well as the interstage volume, in order to cool the disks and blades they support. The cooling air is conveyed radially outwardly from the turbine section through channels formed in the turbine blades.

In such engines, virtually all of the connections between components are accomplished through bolting. That is, the forward face plate is connected to the stage one disk by a circular pattern of bolts, extending about the face plate and disk. The inner periphery of the face plate is bolted to a disk positioned forwardly of the first stage disk. Similarly, the interstage thermal seal is connected to the turbine disks through bolts in a circular pattern, typically clamping angular blade retaining rims to the opposite faces of the turbine disks as well. In addition, the second stage disk includes a rearwardly-extending cone which is bolted to the aft seal.

A disadvantage of such bolted connections is that they require holes to be formed in the disks which create stress concentrations and limit the useful lives of the seals and disks. Furthermore, additional disk weight is required to sustain the stresses imposed by the bolt and bolt hole engagements. Accordingly, there is a need for a turbine engine design which minimizes the use of bolted connections between components, yet provides a turbine engine which is relatively easy to assemble and disassemble.

Another disadvantage with such engines is that alignment of the first and second stage disks and seals is difficult to maintain during assembly and operation, which may result in excessive vibrations during operation. Accordingly, there is a need for mounting the first and second stage disks and seals which minimizes alignment problems and further, there is a need for a design which eliminates rotation of the seals in connection with the first and second stage disks.

SUMMARY OF THE INVENTION

The present invention is an aircraft-type gas turbine engine in which the interstage seal, in the turbine section is connected to the first stage disk and the second stage disk by boltless connections, thereby eliminating the time-consuming task of properly torquing the bolts and eliminating the stress concentration problems associated with bolted connections. Further, the present invention prevents rotation of the interstage seal with respect to the first stage disk and the second stage disk by providing an anti-rotation key and retaining wire.

The interstage seal is attached to the stage one disk by a bayonet connection which prevents relative axial movement between these components and includes a peripheral rabbet which engages the stage one disk to prevent relative forward axial and outward radial movement of the seal. Relative rotational movement of the interstage seal is prevented by fitting an anti-rotation key axially into one of the openings between the locked bayonet tabs of the stage one disk aft shaft and the interstage seal. Axial retention of the anti-rotation key is accomplished by a circumferential wire inserted through circumferential slots formed in the bayonet tabs of the seal and through a groove in the anti-rotation key.

The interstage seal includes a central web and bore, the latter of which includes the bayonet tabs which engage the corresponding bayonet tabs of the aft shaft. The openings of the bayonet connection allow cooling air to circulate through the interstage volume.

Accordingly, it is an object of the present invention to provide an aircraft-type gas turbine engine in which bolted connections between the first and second stage disks, and interstage seal are eliminated, thereby eliminating the weight and stress concentrations caused by bolted connection; and an engine in which the interstage seal is prevented from rotational movement; and an engine in which assembly and disassembly of the turbine section is facilitated.

Other objects and advantages of the present invention will be apparent from the following description, the accompanying drawing and the appended claims.

DETAILED DESCRIPTION

Figure 1:
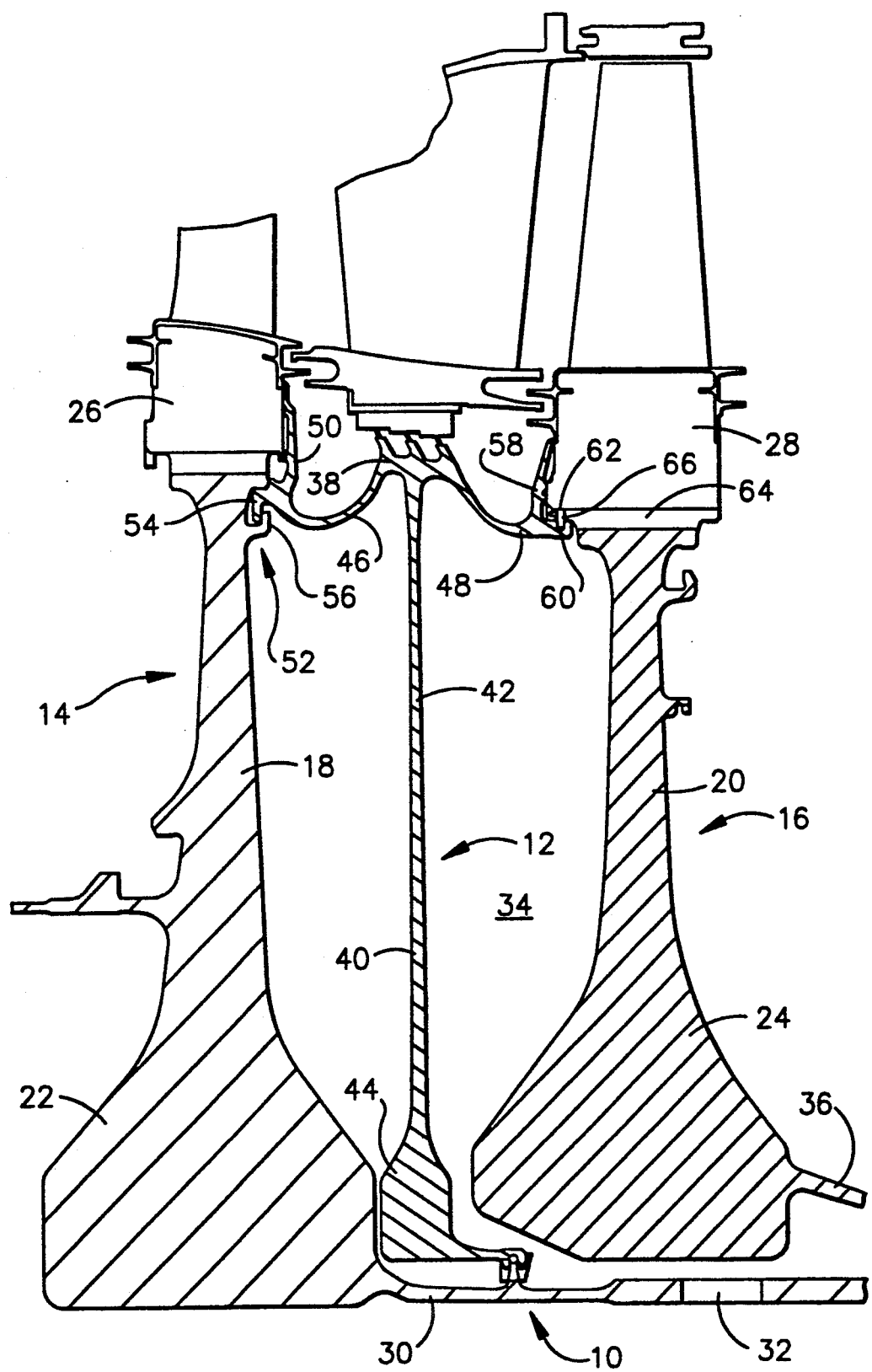
FIG. 1 is a partial side elevation in section of the turbine interstage seal of a gas turbine engine embodying the present invention.

As shown in FIG. 1, the present invention relates to an anti-rotation system, generally designated 10, for an interstage seal 12 located in the turbine section of an aircraft-type high bypass ratio gas turbine engine. The turbine section includes first and second stage disks 14, 16, each having a web 18, 20 extending radially outward from a bore 22, 24, respectively. The webs 18, 20 each terminate in an outer periphery consisting of a plurality of blade dovetail slots 26, 28, respectively.

Bore 22 of first stage disk 14 includes a rearwardly-extending aft shaft 30 which includes a plurality of openings 32 which allow cooling air to enter the interstage volume 34. The second stage disk 16 includes a conical rear arm 36 which ultimately engages the aft shaft 30 at a splined connection.

The interstage seal 12 includes an outer shell 38 and a central disk 40 having a web 42 and a bore 44. The structure and bayonet connections of the interstage seal 12 are disclosed in more detail in commonly-owned U.S. patent application Ser. No. 07/785,404 filed Oct. 30, 1991, U.S. Pat. No. 5,236,302, which is incorporated herein by reference. Shell 38 includes a forward arm 46 and an aft arm 48, connected to first and second stage disks, 14, 16 respectively. The shell 38 is generally cylindrical in shape, and the forward and aft arms 46, 48 each have an inwardly convex shape. More specifically, the forward and aft arms 46, 48 each have a catenary curve, which extends from the shell, to the respective disks 14, 16.

The forward arm 46 includes radially extending blade-retaining rim 50 and forms a bayonet connection 52 with disk 18. Bayonet connection 52 includes a plurality of radially inward-extending tabs 54 extending from forward arm 46 which mesh with radially outwardly-extending tabs 56 formed on web 18 of disk 14.

Aft arm 48 includes an annular, peripheral rim 58 which engages blade dovetail slots 28 and acts as a blade retainer. A seal is affected between the rim and the dovetail slots. Aft arm 48 includes a peripheral groove 60 which is aligned with a corresponding slot 62 formed in the disk post 64. A split ring 66 is positioned in the passageway formed by groove 60 and slot 62 and thereby prevents relative axial movement between aft arm 48 and disk 16.

Figure 2:
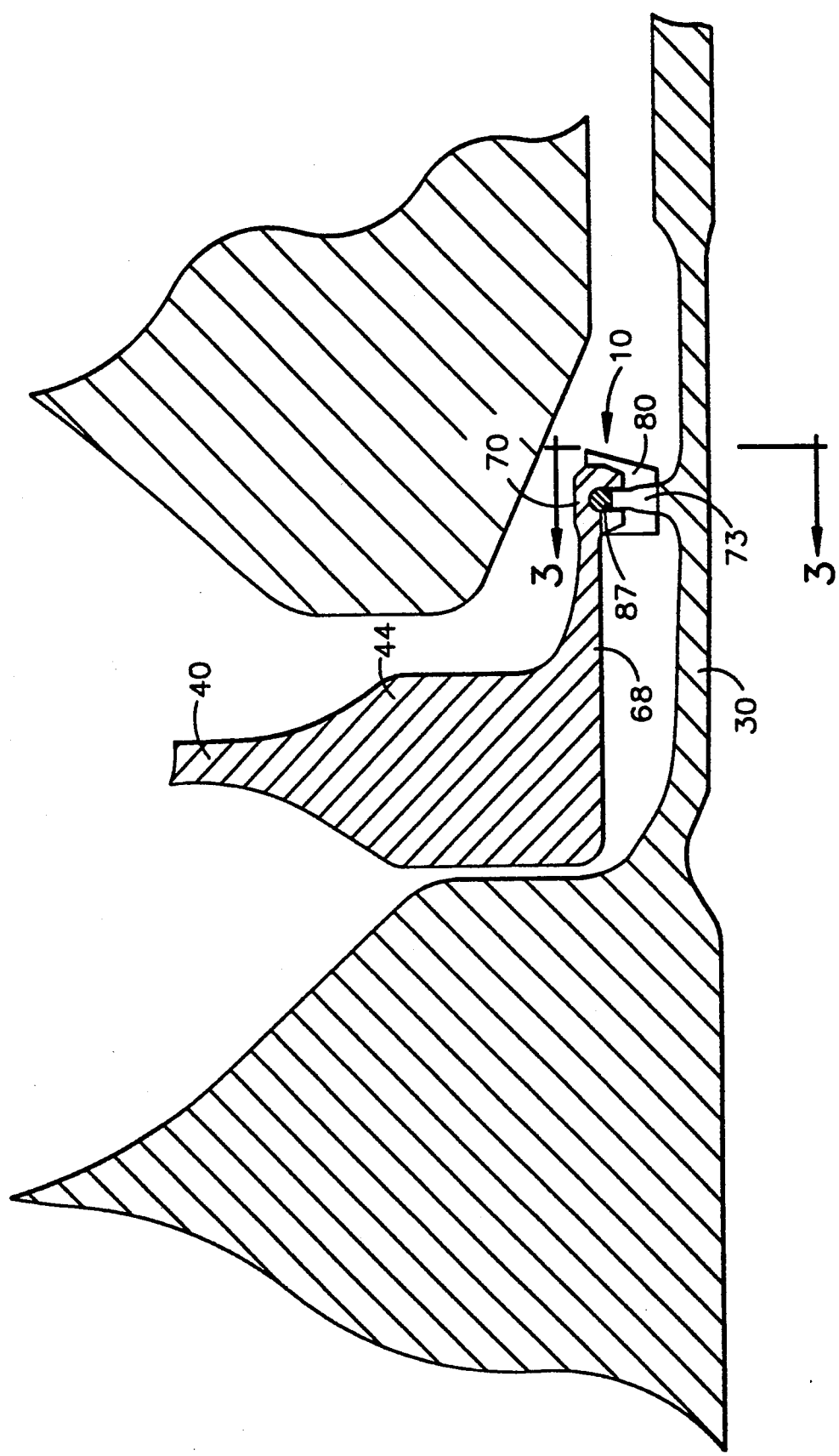
FIG. 2 is a detail of the seal of FIG. 1 showing the anti-rotation key and wire.
Figure 3:
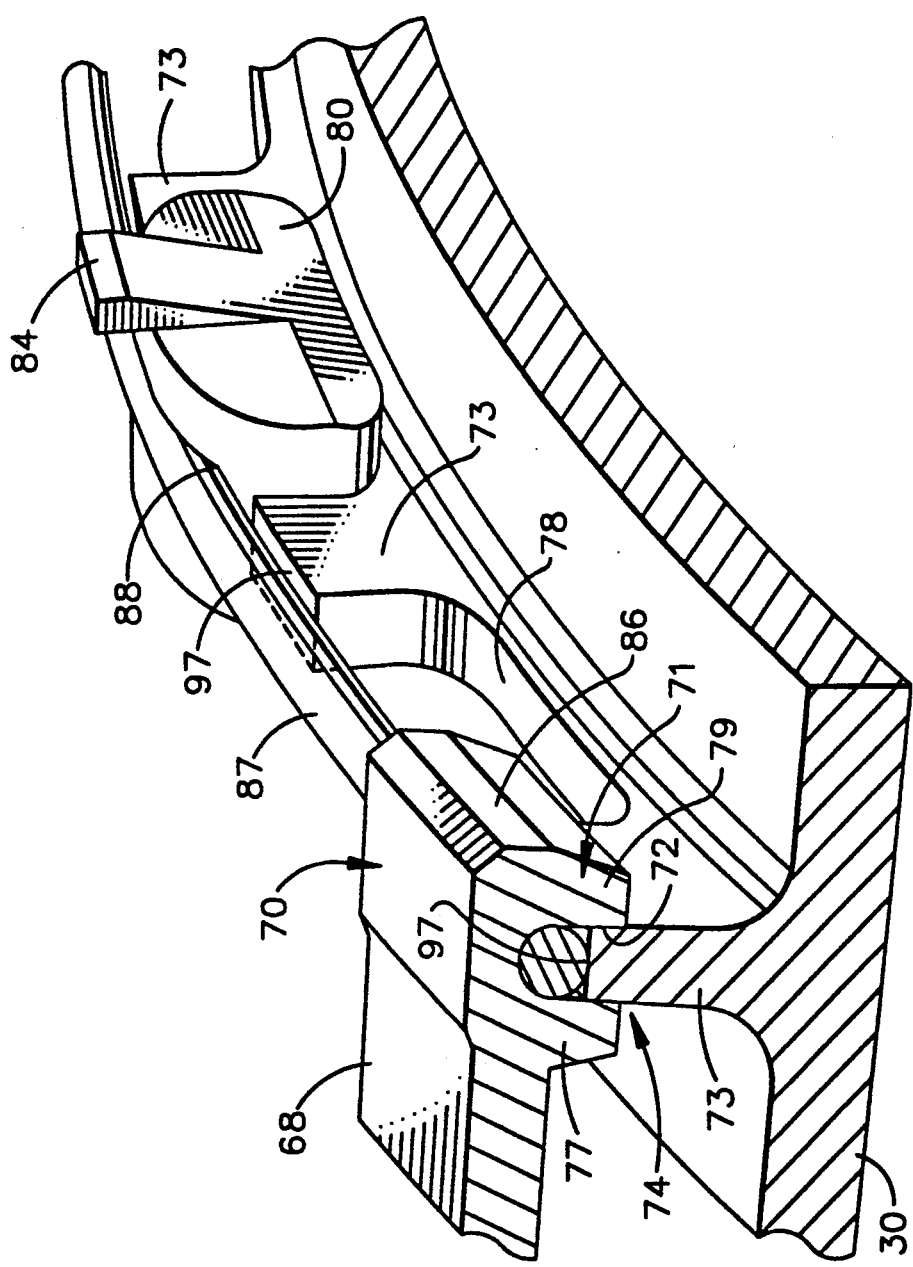
FIG. 3 is a detail of FIG. 2 showing the anti-rotation key and wire in perspective.
Figure 4:
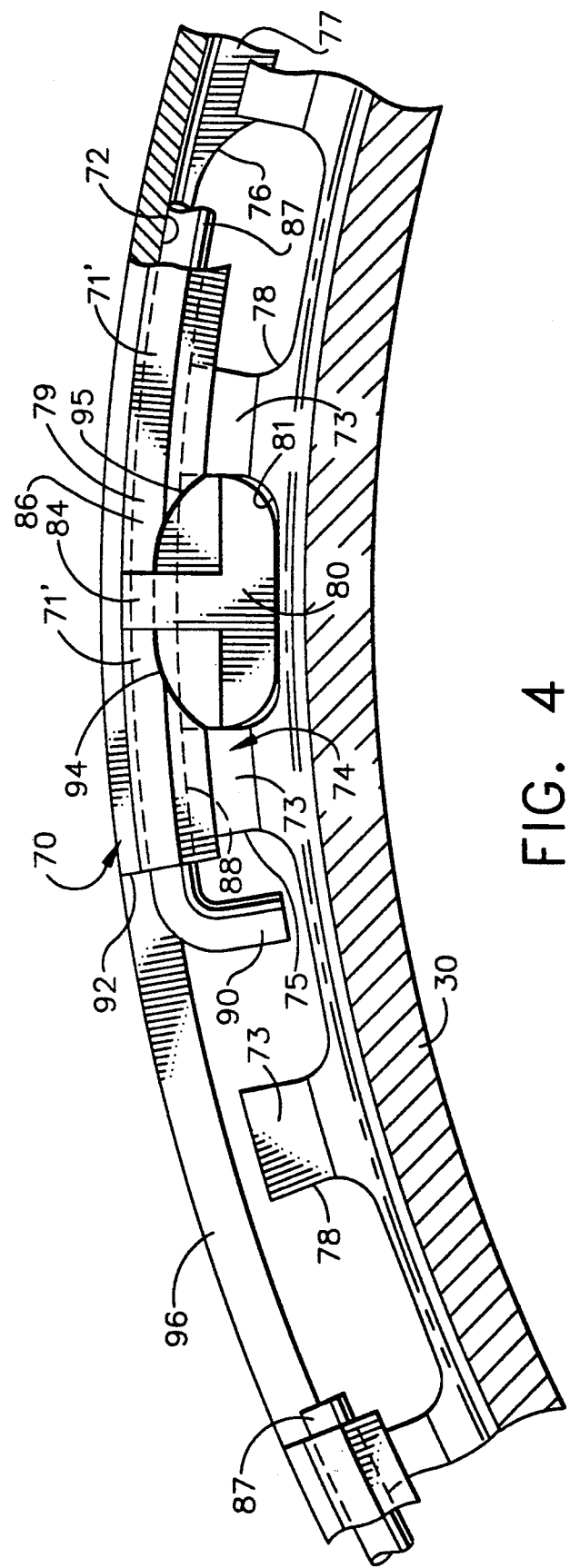
FIG. 4 is an aft elevational view of the key and wire of FIG. 3.

As shown in FIG. 2, disk 40 includes a bore 44 having a conical, rearwardly extending arm 68 terminating in an enlarged tail portion 70. As also shown in FIG. 3, tail portion 70 includes spaced bayonet tabs 71, each having a circumferentially-extending slot 72 extending radially outwardly from the lower surface of the tail portion to receive correspondingly-spaced tabs 73, formed on the aft shaft 30, in a bayonet connection 74. Tabs 71 are separated by arcuate notches 76 (as shown in FIG. 4) formed in the front wall 77 of tail portion 70 shaped to allow the tabs 73 to enter the slot 72 of the tail portion 70. Tabs 73 are separated by scallops 78 which are deep enough to form openings to allow cooling air to flow between aft shaft 30 and conical arm 68. The aft wall 79 is continuous, except for spaces which will be described below. Bayonet connection 74 prevents the relative axial movement between bore 44 and aft shaft 30.

Relative circumferential movement of interstage seal 12 and disk 14 is prevented by the anti-rotation system 10. Referring to FIG. 4, a key 80 is inserted in a correspondingly-shaped space 81 formed between tabs 71 and 73. Preferably, four keys 80 are employed and are positioned in four openings 81 (only one of which is shown) spaced at intervals about the inner periphery of the aft shaft 30 so as to offset any imbalance of the shaft and to reduce the deflection of the seal arm 68.

As seen in FIG. 4, the key 80 is inserted axially into the opening 81 between tabs 73 located on the stage one disk aft shaft 30 and tabs 71' until boss 84, located on the key 80 contacts the aft surface 86 of the aft wall 79 of enlarged tail portion 70 of the conical arm 68. Following installation of the key 80, wire 87 is inserted circumferentially through slot 72 and over a groove 88 formed in the outer surface of the anti-rotation key 80 until a tab 90 on the end of the wire contacts a side wall 75 of tab 73 of the stage 1 disk aft shaft 30. The tabs 71' of the tail portion 70 include arcuate notches 94, 95 which permit axial insertion of the key 80. The tail portion 70 includes a gap 96 to facilitate insertion and removal of the wire 87.

As best shown in FIG. 3, the wire 87 is retained within the slot 72 by engagement of the tabs 73 within the slot, so that the wire contacts the bottom of the slot and the outer face 97 of tabs 75.

During operation of the turbine engine, relative circumferential or rotational movement between the seal 12 and disk 14 is prevented by the anti-rotation system 10. Shear forces imposed on the key 80 are divided into two shear planes, one on each side of bayonet connection 74 for additional anti-rotation strength. The circumferential wire 87 provides axial retention of the key 80 during engine operation, and in addition limits the radial distortion of the conical arm 68 due to point loading during operation of the key 80.

While the form of apparatus herein described constitutes a preferred embodiment of this invention, it is to be understood that the invention is not limited to this precise form of apparatus, and that changes may be made therein without departing from the scope of the invention.

What is claimed is:

1. In a turbine engine of a type having a turbine section including first and second stage disks, and an interstage seal located between said disks, said seal including a web portion and a bore concentric with said first stage disk, an interstage seal anti-rotation system comprising:
    said bore and said first stage disk having interconnecting bayonet means for preventing relative axial movement between said first stage disk and said seal;
    key means interconnected with said bayonet means and said first stage disk for preventing relative circumferential movement between said interstage seal and said first stage disk; and
    retaining means for preventing axial movement of said key means relative to said seal and said first stage disk, whereby said key means is retained in said interconnected position with said seal and said first stage disk; and
wherein said key means includes a key having a radially outwardly extending boss which contacts an aft surface of an aft conical arm of said bore for proper axial positioning of said key relative to said conical arm.

2. In a turbine engine of a type having a turbine section including first and second stage disks, and an interstage seal located between said disks, said seal including a web portion and a bore concentric with said first stage disk, an interstage seal anti-rotation system comprising:
    said bore and said first stage disk having interconnecting bayonet means for preventing relative axial movement between said first stage disk and said seal;
    key means interconnected with said bayonet means and said first stage disk for preventing relative circumferential movement between said interstage seal and said first stage disk; and
    retaining means for preventing axial movement of said key means relative to said seal and said first stage disk, whereby said key means is retained in said interconnected position with said seal and said first stage disk; and
wherein said bayonet means includes said first stage disk having an aft shaft including a plurality of spaced bayonet tabs; said bore having an aft conical arm including a plurality of complimentary bayonet tabs; said aft shaft bayonet tabs and said aft conical arm bayonet tabs having openings therebetween when said first stage disk and said seal interconnect; and said key means includes a key inserted into a first selected one of said openings.

3. The system of claim 2 wherein said conical arm and said key each include complementary grove means; and said retaining means includes a circumferential wire positioned in said groove means.

4. The system of claim 3 wherein said key includes a radially outwardly extending tab, positioned to abut said conical arm for proper alignment of said key relative to said conical arm.

5. The system of claim 4 wherein said wire includes a tab located on an end thereof for preventing rotation of said wire to a key release orientation.

6. The system of claim 5 wherein said conical arm includes a gap between said tabs thereon, and said wire tab is positioned in said gap, whereby said gap facilitates insertion and removal of said wire.

7. The system of claim 3 wherein said groove in said conical arm is shaped to receive said first stage disk bayonet tabs therein, whereby said wire is captured within said conical arm groove, and said conical arm bayonet tabs and said first stage disk bayonet tabs create a double shear plane with respect to said key.

* * * * *